United States Patent [19]
Brown et al.

[11] 3,939,318
[45] Feb. 17, 1976

[54] ELECTRICAL PUSH-BUTTON SWITCH

[75] Inventors: John Graham Brown, Dartford; John Peter Stocker, London, both of England

[73] Assignee: International Standard Electric Corporation, New York, N.Y.

[22] Filed: Apr. 25, 1974

[21] Appl. No.: 464,015

[30] Foreign Application Priority Data
May 4, 1973 United Kingdom............... 21246/73

[52] U.S. Cl................................ 200/159 R; 200/76
[51] Int. Cl............................................. H01h 13/26
[58] Field of Search........ 200/76, 159 R, 67 C, 290, 200/5 A

[56] References Cited
UNITED STATES PATENTS

| | | | |
|---|---|---|---|
| 2,967,218 | 1/1961 | Dorjee................................. | 200/76 |
| 3,402,374 | 9/1968 | Gaines et al...................... | 200/76 X |
| 3,764,761 | 10/1973 | Poltorak et al...................... | 200/76 |

FOREIGN PATENTS OR APPLICATIONS

| | | | |
|---|---|---|---|
| 228,912 | 8/1958 | Australia............................. | 200/76 |
| 645,931 | 12/1927 | France................................. | 200/68 |
| 1,210,064 | 2/1966 | Germany............................. | 200/76 |
| 776,288 | 8/1954 | United Kingdom................... | 200/76 |

*Primary Examiner*—Robert K. Schaefer
*Assistant Examiner*—William J. Smith
*Attorney, Agent, or Firm*—John T. O'Halloran; Menotti J. Lombardi, Jr.; Richard A. Menelly

[57] ABSTRACT

An electrical push-button switch in which the push button has a shank extending through a passage in the switch housing for engaging an electrical contact set. The passage through which the shank extends has a series of notches around the periphery for receiving one end of a pair of springs, the other end of each spring is attached to the shank. The springs have an N-shaped configuration with an extension at one end of the N. A pair of complimentary stationary portions of the switch housing extend in the path of and engage the extended portions of the springs after the push button is depressed. The initial depression of the push button causes the shank to move against the tension of the springs until a changeover point is reached, thereafter the push button movement is assisted by the springs for a further period of travel. Upon additional movement, the extensions on the springs then contact the complimentary extending portions of the housing so that further movement of the shank is now opposed by the action of the springs. The switch is designed so that the shank then comes in contact with and depresses the set of electrical contacts. The contact restoring springs operate to return the button to its initial rest position and are assisted by the tension created in the aforementioned push-button springs in cooperation with said extended portions of the housing.

7 Claims, 9 Drawing Figures

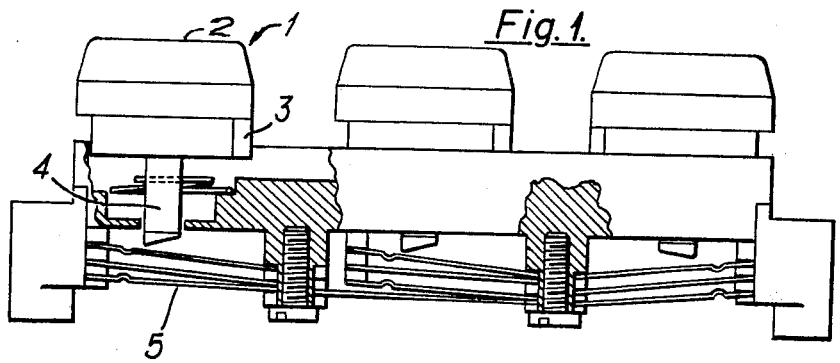
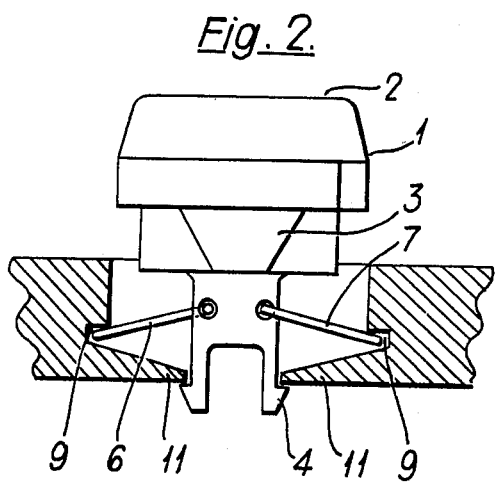
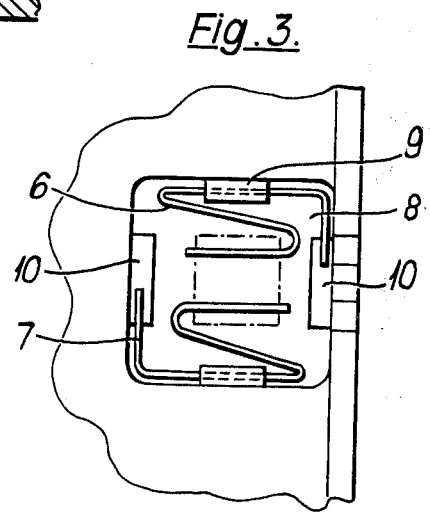

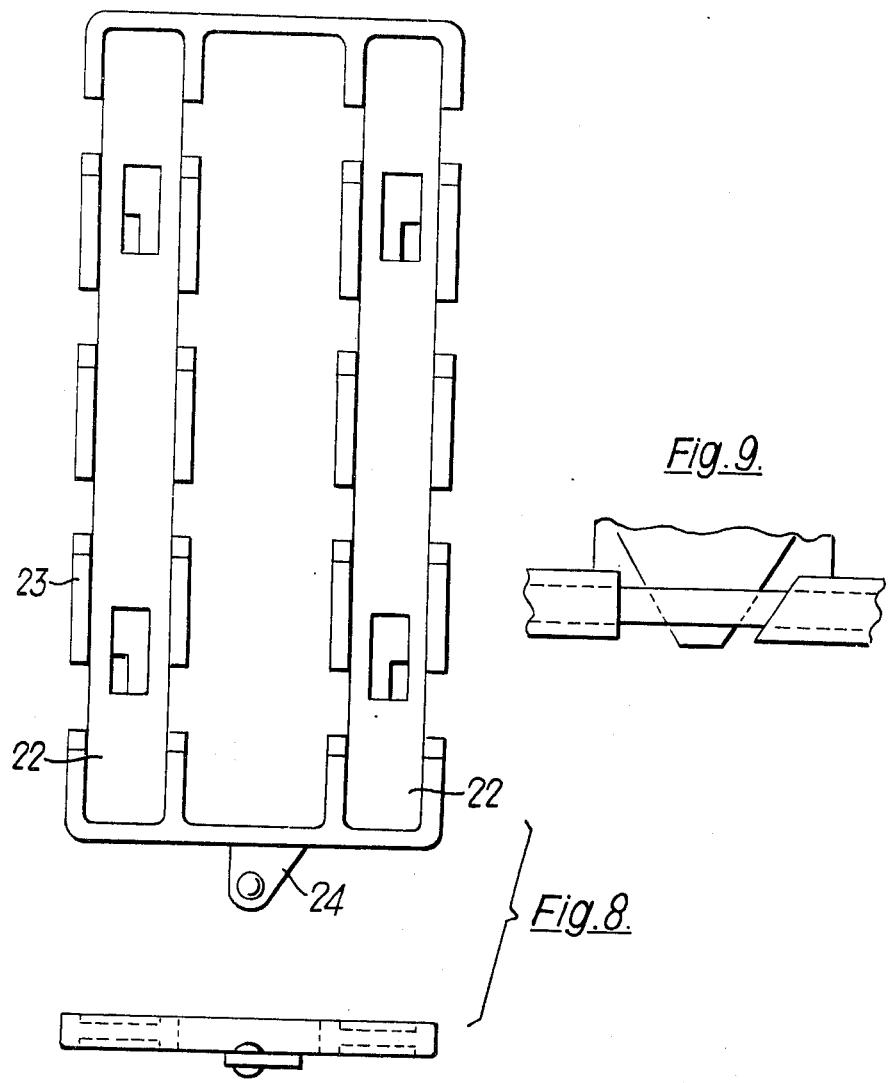

ELECTRICAL PUSH-BUTTON SWITCH

BACKGROUND OF THE INVENTION

This invention relates to electrical push-button switches, and to sets of such switches, such as used on telephone subscribers' instruments.

There is provided an electrical push-button switch in our British Patent No. 1,309,710 (J. G. Brown et al. 1-1), in which each said spring member has at its said one end an extension portion which when the button is at rest does not engage any stationary part of the switch, in which part-way through the movement of the button due to the depression thereof each said spring member's extension portion engages a stationary portion of the switch so that further movement of the button is opposed by the tension created in said extension portions, and in which on release of the button the initial portion of its restoration to rest is assisted by the tension in said extension portions.

SUMMARY OF THE INVENTION

According to the present invention there is provided an improved electrical push-button switch, in which the push button has a shank extending through a support so that its end engages one of the contacts of an electrical contact set, in which the hole in the support which receives said shank has notches distributed about its periphery, each of which notches receives a portion of one of a plurality of spring members near to one of its ends, in which the other ends of the spring members are each located in the shank so that the spring members urge the shank and hence the push button towards rest, in which said one end of each said spring member is bent at an angle to the portion in its said notch to provide an extension portion at said one end, which extension portion is out of engagement with the stationary parts of the switch when the button is at rest, in which on depression of the push-button the latter initially moves against the influence of the spring member until a changeover point is reached whereafter the spring members assist the push-button movement, in which part-way through the movement the extension portions of the spring members each engages a stationary portion of the switch so that further movement is opposed by the tension created in said extension portions, in which the movement of the contacts in the contact set due to the depression is against the springyness of the contacts, in which on release of the push button the contacts' springyness asserts itself to restore the button to rest, in which said restoration is assisted by the tension created in said extension portions due to their engagement with the stationary portions of the switch, and in which the restoration movement due to the springyness of the contacts and the tension in the extension portions is initially opposed by the influence of the spring members until a changeover point is reached, whereafter the spring members assume control.

BRIEF DESCRIPTION OF THE DRAWINGS

An embodiment of the invention will now be described with reference to the drawings, in which:

FIGS. 1 and 2 are part-sectioned views of a push-button switch according to the invention;

FIG. 3 shows the hole in top view into which the switch of FIGS. 1 and 2 fits;

FIGS. 8 and 9 show the common contact bar used with the push-button switch of this invention.

DESCRIPTION OF THE PREFERRED EMBODIMENT

Figure 4:
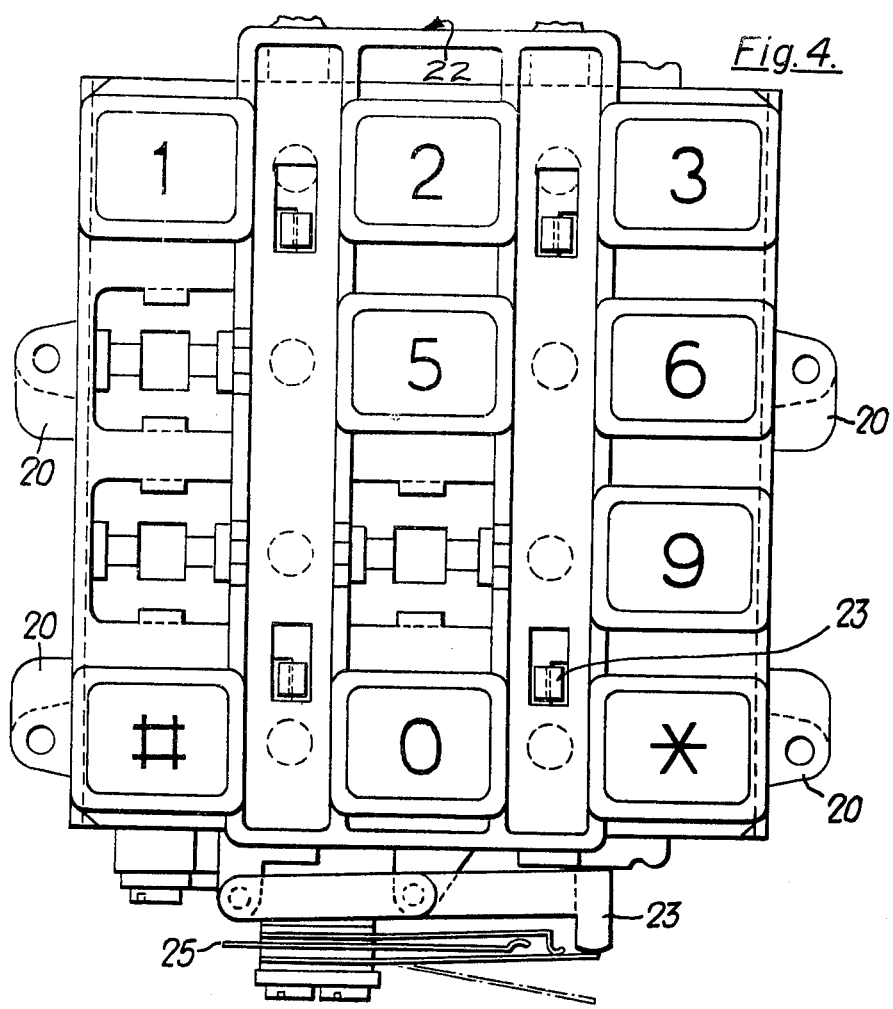
FIGS. 4 and 5 are top and side views, also partly-sectioned, of a push-button set using the switches of FIGS. 1 and 2, and thus having twelve holes each like that of FIG. 3.

Each push button 1 has a cap 2 on its upper end, which (see FIG. 4) bears a digit member, and has a trapezoidal projection 3 on one side of its stem. The sloping sides of this provide ramps whose use will be explained later. The shank 4 of the button ends adjacent to a contact set 5, and as can be seen in FIG. 2 this shank is split into two legs. The shank also has two holes into which the ends of two springs 6, 7 fit.

As can be seen from FIG. 3, each of these springs is roughly N-shaped, but with a tail 8 on the end of one leg of the N. Each spring has one leg of the N ledged in one of the holes in the button shank, and its other leg received in a recess 9 in the structure into which the shank 4 fits. The tail extension 8 of each spring is associated with a tab or ledge 10, 10 on one side of the hole into which the button shank extends, but when the button is in its rest position is out of engagement with its tab 10.

The buttons are each inserted in their holes by pushing in from the top, in which case the two legs into which the shank is split move inwards as they pass through the hole defined by 11, 11. The notched ends of the legs pass through the hole and are then retained in place as shown in FIG. 2, the legs having resilience. The upper end of the button structure onto which its cap fits is a close but sliding fit in its hole.

When the button is pushed it commences to move downward against the urgence of the two springs until these springs are almost at right angles to the shank axis. After this point the button movement is assisted by the springs, giving a so-called collapsing action. Shortly after the "snap-over" point is reached the tails 8 on the springs engage the tabs 10 and thus exert a slight opposing action to the movement.

When the button is released, it is urged upwards by the resilience of the contact spring set acting on its bottom end, which upward movement is initially opposed by the springs. However, a third factor is present in that the two tails 8 which were tensioned during depression assert themselves to help the initial button movement. When the button reaches the snap-over point, the springs 6 and 7 are tending to drive the button home, and the action of the tails has ended. Hence we get an "inverse collapsing" action on resetting.

The remainder of the drawings relate to a push-button set for use in a telephone subscriber's instrument, in which the buttons are assembled in the wellknown 3 × 4 array, the 11th and 12th buttons (the ones which flank the O button) providing certain subscriber facilities. These could be call transfer, or could provide the functions of the well-known secretary/executive sets. As can be seen from FIGS. 4 and 5, there are brackets 20 on the side for mounting the set.

Figure 5:
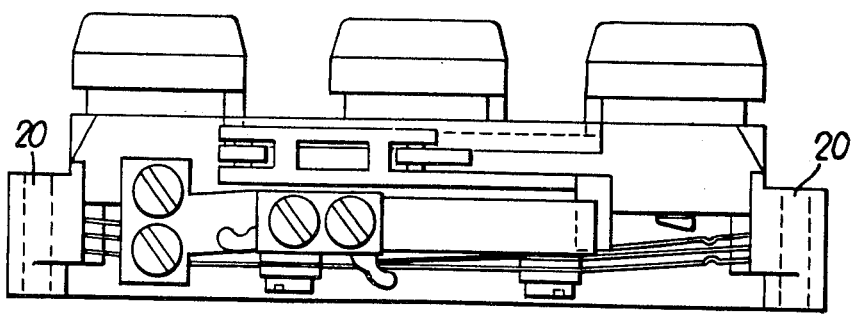

In some cases it is desired to operate a common contact set when any one of the buttons is pushed. This uses a common bar 21 shown in FIG. 8, which has two wide strips 22, 22 with rectangular holes which fit over upstanding square pillars such as 23 (FIG. 4). As can be seen from FIGS. 4 and 5, these wide strips 22 each lie between two rows of buttons and on such a level as to be able to cooperate with the ramps on the buttons.

Referring back to FIG. 8, on the sides of the strips 22 there are projections such as 23 each with a ramp-like edge. The manner in which the bar operates will be seen from the scrap view of FIG. 9. Here it will be seen that as the button is pushed its ramp engages a ramp on the common bar and moves it longitudinally. When this happens a contact-operating arm 23, FIG. 4, pivotally mounted on a bracket 24 on the common bar operates the common contact set 25. Resetting is under the spring urgence of the contacts 25, and may be assisted by a restoring spring if necessary.

It will be appreciated that in some cases no common contact set is needed, in which case the common bar is omitted.

Figure 6:
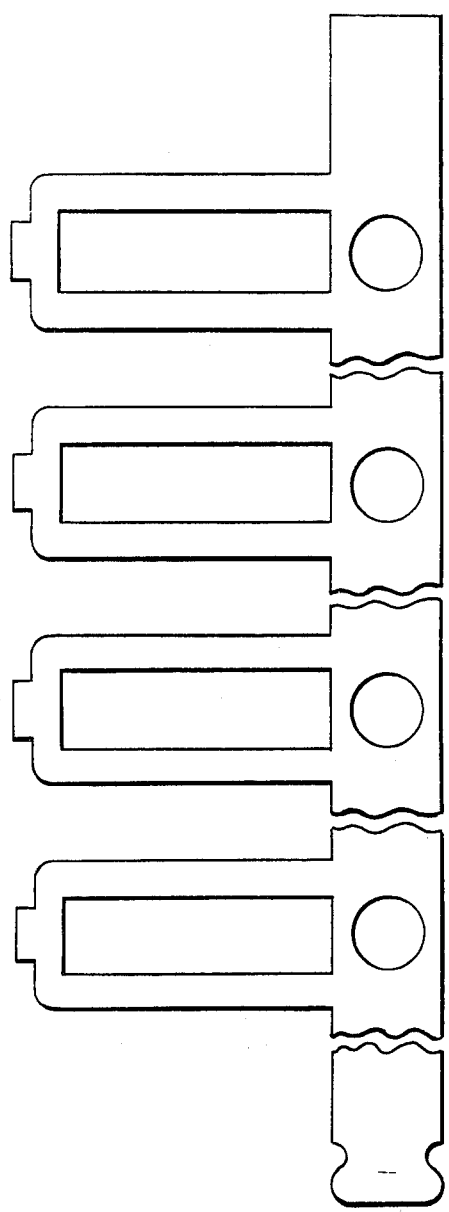
FIGS. 6 and 7 show the contacts of telephone sets operated by the push buttons in vertical and horizontal unit form.
Figure 7:
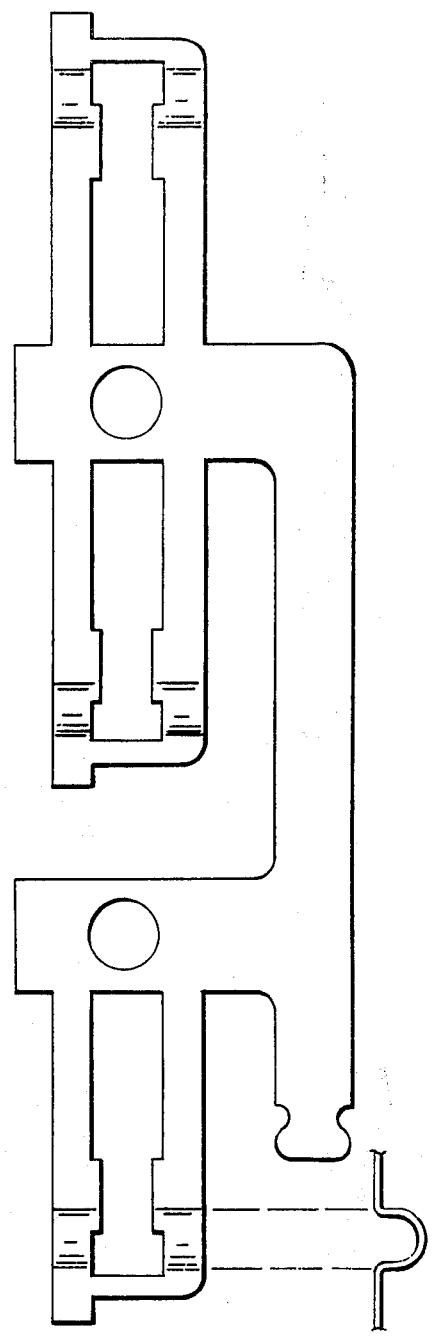

The contacts of the sets operated by the push buttons each form part of a vertical or horizontal unit, as shown in FIGS. 6 and 7, which are on a larger scale than the other drawings. The vertical unit, FIG. 6, is shown fragmented so that it will fit in on the page. Note that each unit such as that of FIG. 7 is turned through 90° as compared with FIG. 7 when in use. Note that the horizontal contacts have bent ends as shown in the small inset to FIG. 7.

It is to be understood that the foregoing description of specific examples of this invention is made by way of example only and is not to be considered as a limitation on its scope.

What is claimed is:

1. An improved electrical push-button switch of the type having a shank extending through a passage in a switch housing, and a pair of springs extending between said housing and said shank, whereby depressing said push button causes said shank to move against the tension of the springs until a cross-over point occurs, whereafter the springs assist the movement of the shank, wherein the improvement comprises:

at least one extended portion on each of said springs in cooperation with stationary extended portions on said housing so that when the push button is in its initial rest position, said extended portions of the springs are not in contact with said extended portions of said housing, and when said push button is depressed, the movement of said shank becomes opposed by the springs when said extended portion of each spring engages said complimentary extended portion of the housing, and when said button is released said shaft is restoratively returned to its rest position by means of the tension in said springs caused by the extension of said spring in cooperation with the extension on said housing.

2. An electrical push-button switch, in which the push button has a shank extending through a passageway, in a support so that its end engages one of the contacts of an electrical contact set, in which the passageway in the support which receives said shank has notches distributed about its periphery, each of which notches receives a portion of one of a plurality of spring members near to one of its ends, in which the other ends of the spring members are each located in the shank so that the spring members urge the shank and hence the push button towards rest, in which said one end of each said spring member is bent at an angle to the portion in its said notch to provide an extension portion at said one end, which extension portion is out of engagement with the stationary parts of the switch when the button is at rest, in which on depression of the push button the latter initially moves against the influence of the spring members until a change-over point is reached whereafter the spring members assist the push button movement, in which partway through the movement the extension portions of the spring members each engages a stationary portion of the switch so that further movement is opposed by the tension created in said extension portions, in which the movement of the contacts in the contact set due to the depression is against the springiness of the contacts, in which on release of the push button the contacts' springyness asserts itself to restore the button to rest, in which said restoration is assisted by the tension created in said extension portions due to their engagement with the stationary portions of the switch, and in which the restoration movement due to the springyness of the contacts and the tension in the extension portions is initially opposed by the influence of the spring members until a change-over point is reached, whereafter the spring-members assume control.

3. The push-button switch of claim 2 wherein the passageway in said support has a square cross-section containing two diametrically opposed notches, each of said notches adapted to receive at least one spring member and wherein said extension portion comprises a tab extending outward from said support for engaging said extension portions of said spring members.

4. The push-button switch of claim 1 wherein each spring comprises an N-shaped member with one leg of the N bent inward at right angles to the base of the N to provide an extended portion thereto.

5. An electrical push-button assembly comprising a coordinate array of m × n switches according to claim 1 wherein each of said switches controls one of the contact sets in each $m \times n$ array.

6. The electrical push-button assembly of claim 5 further including a common contact set, said contact set becoming operational when any of said switches is depressed, and wherein an operating member for said contact set is provided which becomes operational when any of said push-button switches is depressed.

7. The electrical push-button assembly of claim 6 wherein said operating member comprises a number of flat strips between two rows or columns of push buttons and wherein said strips have complimentary projections on their sides, each of said projections in alignment with a corresponding push button, each of said projections having a sloping portion for cooperating with a corresponding sloping portion on each push button whereby depressing one of said push buttons causes the sloping portion of said push button to correspondingly engage a sloping portion on said projection causing said common contact set to become operational.

* * * * *